(12) United States Patent
Lange et al.

(10) Patent No.: US 10,120,986 B2
(45) Date of Patent: Nov. 6, 2018

(54) CONTROLLING EXECUTION OF A SOFTWARE APPLICATION ON AN EXECUTION PLATFORM IN A LOCAL NETWORK

(71) Applicant: SFNT Germany GmbH, Germering (DE)

(72) Inventors: Andreas Lange, Germering (DE); Pratyush Kumar, Noida (IN); Michael Zunke, Germering (DE)

(73) Assignee: SFNT GERMANY GmbH, Germering (DE)

( * ) Notice: Subject to any disclaimer, the term of this patent is extended or adjusted under 35 U.S.C. 154(b) by 13 days.

(21) Appl. No.: 14/305,771

(22) Filed: Jun. 16, 2014

(65) Prior Publication Data

US 2015/0169852 A1 Jun. 18, 2015

(30) Foreign Application Priority Data

Dec. 18, 2013 (EP) .................................... 13198170

(51) Int. Cl.
*G06F 21/12* (2013.01)
*H04L 29/06* (2006.01)

(52) U.S. Cl.
CPC ........ *G06F 21/121* (2013.01); *H04L 63/0876* (2013.01)

(58) Field of Classification Search
CPC ........... G06F 21/12; G06F 21/30; G06F 21/44
See application file for complete search history.

(56) References Cited

U.S. PATENT DOCUMENTS

| 8,402,459 B2* | 3/2013 | Doui ..................... G06F 21/105 717/176 |
| 9,124,633 B1* | 9/2015 | Eizadi ..................... H04L 61/20 |
| 2013/0104125 A1* | 4/2013 | Sarma ..................... G06F 21/10 718/1 |
| 2013/0191643 A1* | 7/2013 | Song ..................... H04L 9/3247 713/176 |

* cited by examiner

*Primary Examiner* — Hadi S Armouche
*Assistant Examiner* — Paul E Callahan
(74) *Attorney, Agent, or Firm* — Drinker Biddle & Reath LLP

(57) ABSTRACT

A method for controlling an execution of a software application on an execution platform in a first local network comprises: determining a first environment fingerprint including a first network fingerprint characteristic for the first local network using predetermined rules; generating a license including the first environment fingerprint and defining terms of allowed execution of the software application; and controlling the execution by: determining a second environment fingerprint including a second network fingerprint of a local network in which an execution platform for the software application is included using the predetermined rules; comparing the second environment fingerprint with the first environment fingerprint of the license; allowing execution of the software application according to the terms of the license where the second environment fingerprint complies with the first environment fingerprint, and preventing the execution of the software application where the second environment fingerprint does not comply with the first environment fingerprint.

12 Claims, 2 Drawing Sheets

CONTROLLING EXECUTION OF A SOFTWARE APPLICATION ON AN EXECUTION PLATFORM IN A LOCAL NETWORK

BACKGROUND

The present disclosure relates to a method for controlling an execution of a software application on an execution platform in a first local network.

It is known to control the execution of a software application such that execution is allowed only if there is a corresponding license. The license can be locked to a secure hardware device to be connected to the execution platform. In this case the execution can be carried out only in the presence of the connected secure hardware device. Since in this case the software publisher or vendor has to deliver the software application and the secure hardware device to the end user, this kind of protection is preferred for expensive software applications.

In less expensive software applications it is often preferred to lock the license to the hardware of the execution platform.

However, if the software application is to be executed in a virtual machine running on the hardware of the execution platform, the hardware of the execution platform can often no longer be used for locking the license.

In view thereof, one object of the present specification is to provide an improved method for controlling an execution of a software application on an execution platform in a first local network.

SUMMARY OF THE DISCLOSURE

In one disclosed embodiment a method for controlling execution of a software application on an execution platform in a first local network comprises:

a) determining a first environment fingerprint including a first network fingerprint of the first local network by using predetermined rules, so that the first network fingerprint is characteristic for the first local network and can be used to distinguish the first local network from at least some other local networks;

b) generating a license including the first environment fingerprint, where the license defines terms of an allowed execution of the software application on an execution platform in the first local network; and c) controlling the execution by:

determining a second environment fingerprint including a second network fingerprint of the local network (second local network) in which the execution platform for the software application is included by using the predetermined rules;

comparing the second environment fingerprint with the first environment fingerprint of the license;

allowing the execution of the software application according to the terms of the license in a case where the second environment fingerprint complies with the first environment fingerprint; and preventing the execution of the software application in a case where the second environment fingerprint does not comply with the first environment fingerprint.

In an embodiment, if the first and second environment fingerprints do not comply, there is an inference that the second local network (in which the execution platform for the software application is included) is not the same as the first local network (for which the license was generated). Execution may then be prevented because it may be inferred that the software application has been improperly moved or copied to a different environment outside the scope of the license.

On the other hand, execution may be permitted if the first and second environment fingerprints do comply, and there is an inference that the first and second local networks are the same network.

According to one embodiment of a method, the license is locked to the first local network so that an effective control of the execution of the software application can be carried out even if the software application is executed in a virtual machine. Therefore, the license is no longer locked to the execution platform itself but to the environment in which the execution platform is included.

According to an embodiment, the second network fingerprint complies with the first network fingerprint when the two network fingerprints (at least partly) match or are (at least partly) the same, for example.

There can be used a unique feature or a unique information of the first local network for determining the first environment fingerprint or the first network fingerprint in step a).

The step c) can be carried out when the execution of the software application starts and/or during the execution of the software application (e.g. periodically).

It is not essential for the environment fingerprint to be globally unique. However, it is desirable for the environment fingerprint to be sufficiently distinctive that the probability of two different local networks having complying fingerprints is acceptably low. For purposes of commercial license enforcement, a small incidence of erroneous allowance may be tolerable, if the marginal cost of more exact enforcement outweighs the marginal benefit. It is also usually desirable for the environment fingerprint of one local network not to be easily imitated on another local network.

For carrying out the step a) the first local network can be used as it is present. That means, that the present method does not generate a unique feature by amending the first local network and that, for example, characteristics of at least one network printer, at least one network storage device, and/or at least one network server may be used. Further, it is possible to use the domain name of the first local network, characteristics of at least one of the network users, other unique information stored in an active directory or LDAP (Lightweight Directory Access Protocol) directory of the first local network, etc.

For example, the unique information can be a user identifier (user ID)+password or a globally unique identifier (GUID)+password. Such a unique information is characteristic for a corresponding local network and it is very difficult to transfer it to another local network, leading to good protection against unauthorized use of the software application.

In addition, it is possible to amend the first local network and to use this amendment for determining the first network fingerprint. For example, an additional network user can be created and characteristics of this additional network user are used for determining the first network fingerprint. Further, it is possible to create an entry in the active directory or in the LDAP of the first local network and use it as unique information. In particular, at least one network service, which is provided in the first local network, can be used in order to generate something unique for the first local network. Such an amending of the first local network is preferably carried out before step a).

Further, it is possible that the first network fingerprint includes several different features and that only a predetermined number of these features of a predetermined percentage of these features have to be the same in the first and second network fingerprint for determining the result that the second environment fingerprint complies with (or is in coincidence with) the first environment fingerprint. This can be accepted for a limit number of comparisons, for a limit time or in general.

In particular, the two environment fingerprints can be considered as being compliant if a predetermined percentage of the first network fingerprint is present in the second network fingerprint or if a predetermined percentage of the first environment fingerprint is present in the second environment fingerprint.

The two environment fingerprints can be considered as being compliant if a predetermined partial compliance (or, for example, a partial match) of the two environment fingerprints is present. In particular, the license can include a predetermined compliance algorithm which carries out the step of comparing the two environment fingerprints in step c). By using such a predetermined compliance algorithm it is possible to give different features of the network fingerprints different weights, for example.

Further, the first network fingerprint can include at least two features and the method can include the step of checking whether all features of the first network fingerprint are present. In the case where some but not all features of the first network fingerprint are present, at least one of the features not present may then be replaced by another feature of the first local network. The replacement can be carried out by completely replacing at least one of the features not present or by marking at least one of the features not present as a feature that is no longer relevant and that is no longer to be used when comparing the two network fingerprints. If, for example, a network printer is no longer present, this feature of this network printer can be replaced by a new network printer, a new network storage or something else which is characteristic for the first local network.

Further, it may be possible for the first network fingerprint to be amended such that an additional feature characterizing the first local network is added to the first network fingerprint.

By amending the first environment fingerprint, it is possible to adapt the license to normal changes in a local network. The first environment fingerprint and/or the license can be signed and/or encrypted. In that case, a check of the signature and/or a decryption step is carried out before comparing the second environment fingerprint with the first environment fingerprint.

The first environment fingerprint can include a first execution platform fingerprint that is characteristic for the execution platform in the first local network and that is determined in step a). The second environment fingerprint can include a second execution platform fingerprint that is determined in step c). In that case, the comparison of the two environment fingerprints can also include the comparison of the two execution platform fingerprints. By doing this it can be ensured that the software application can only be run on the specific execution platform in the first local network.

The software application can include a module for carrying out the mentioned methods.

A local network is preferably to be understood as a network which is only accessible for a limited number of users, as for example a local network of a company. The internet is not then a local network.

The execution platform is preferably a part of the first local network and can be a single computer or a virtual machine, for example. The virtual machine can be a software implementation of a machine (e.g. a computer) that executes programs or software applications like a physical machine.

There is further provided a computer program product which comprises software code in order to carry out any of the above described methods (optionally including any or all of the mentioned further developments and optional features), when the product is being executed.

There is further provided a non-transitory computer readable storage medium embodying such a computer program product.

There is further provided a control system for controlling an execution of a software application on an execution platform in a first local network, comprising a control module carrying out the following steps:

a) determining a first environment fingerprint including a first network fingerprint of the first local network by using predetermined rules, where the first network fingerprint is characteristic for the first local network and can be used to distinguish the first local network from other local networks;

b) generating a license including said first environment fingerprint, where the license defines terms of allowed execution of the software application on an execution platform in the first local network; and c) controlling the execution by:

determining a second environment fingerprint including a second network fingerprint of the local network in which the execution platform for the software application is included by using the predetermined rules;

comparing the second environment fingerprint with the first environment fingerprint of the license; and allowing the execution of the software application according to the terms of the license when the second environment fingerprint complies with the first environment fingerprint and preventing the execution of the software application when the second environment fingerprint does not comply with the first environment fingerprint.

The control system can comprise features for carrying out the methods either as described or including further developments. In particular, the control module can be software and/or hardware. The method for controlling an execution of a software application on an execution platform in a first local network can comprise method steps described in connection with the control system.

It is understood that the features mentioned above and those yet to be explained below can be used not only in the respective combinations indicated, but also in other combinations or in isolation, without departing from the scope of the present application.

BRIEF DESCRIPTION OF THE DRAWINGS

The above and other aspects, features, and advantages of the disclosed embodiments may be more apparent from the following more particular description of embodiments thereof, presented in conjunction with the following drawings. In the drawings.

DETAILED DESCRIPTION OF THE DISCLOSED EMBODIMENTS

A better understanding of various features and advantages of the present methods and devices may be obtained by reference to the following detailed description of illustrative embodiments and accompanying drawings. Although these drawings depict embodiments of the contemplated methods and devices, they should not be construed as foreclosing alternative or equivalent embodiments apparent to those of ordinary skill in the subject art.

Figure 1:
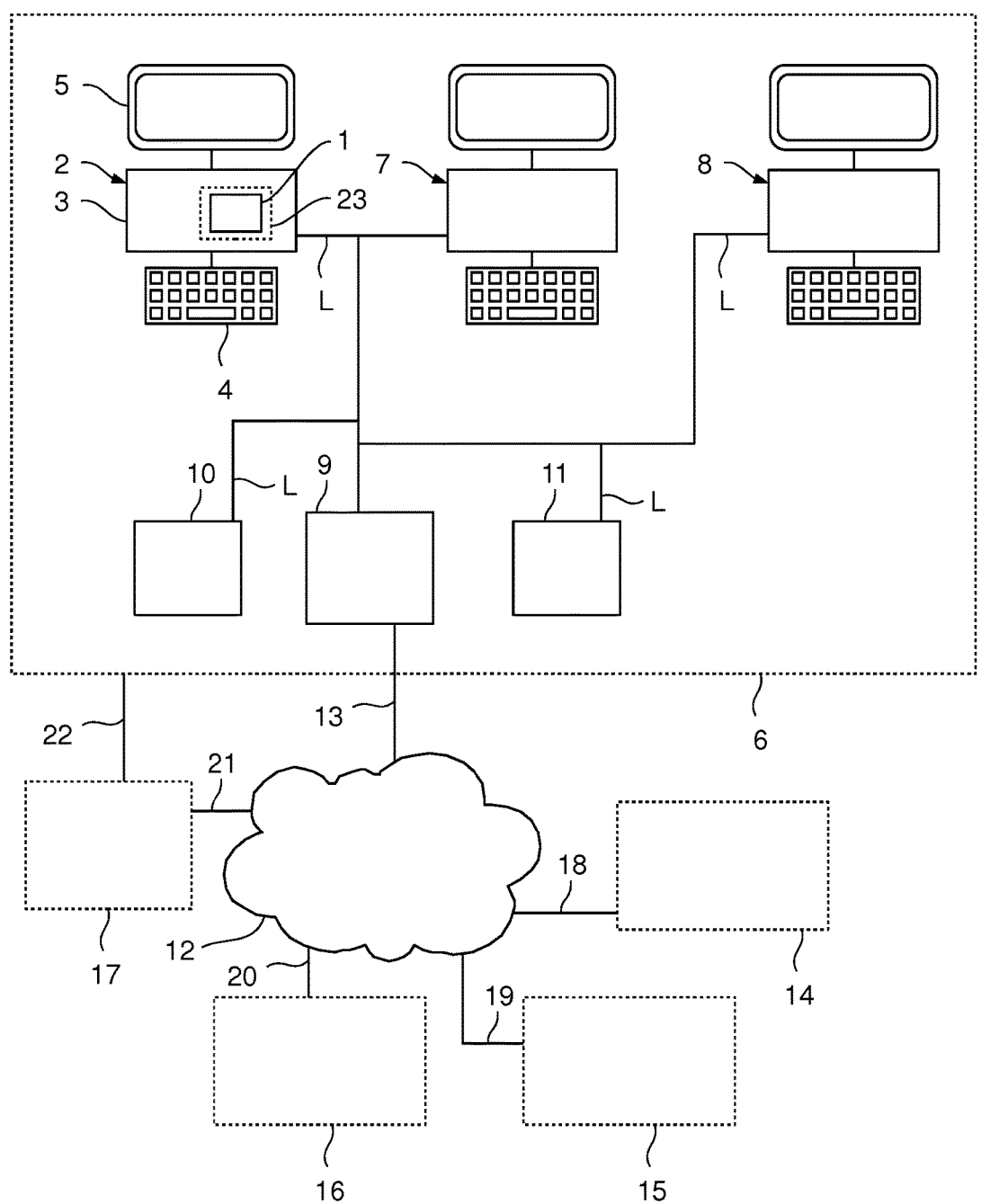
FIG. 1 schematically shows five local networks which can be connected with each other via on the internet.

As shown in FIG. 1 a software application 1 is to be executed on an execution platform 2. The execution platform 2 is embodied as a conventional personal computer, for example, comprising a computing section 3 (comprising, for example, a processor, a hard disk, further hardware elements as well as an operating system), an input unit 4 (in this case, for example, a keyboard) as well as an output unit 5 (e.g. a screen). The execution platform 2 is part of a first local network 6 which comprises further execution platforms 7, 8, which can be embodied in the same or in a different way as the execution platform 2, a server 9, and a first and a second network printer 10, 11. Lines L schematically indicate that these components are all part of the first local network 6. The first local network 6 (or first Local Area Network (LAN) 6) can be connected to the internet 12 as indicated by the line 13.

There may be further local networks 14, 15, 16, 17 which can be connected to the internet 12 (as indicated by the lines 18, 19, 20, 21). Therefore, a connection between the local networks 6, 14-17 is possible via the internet 12. Of course, any other kind of connection between the local networks 6, 14-17 can be present, as indicated by the line 22 showing a connection between the first local network 6 and the further local network 17.

Figure 2:
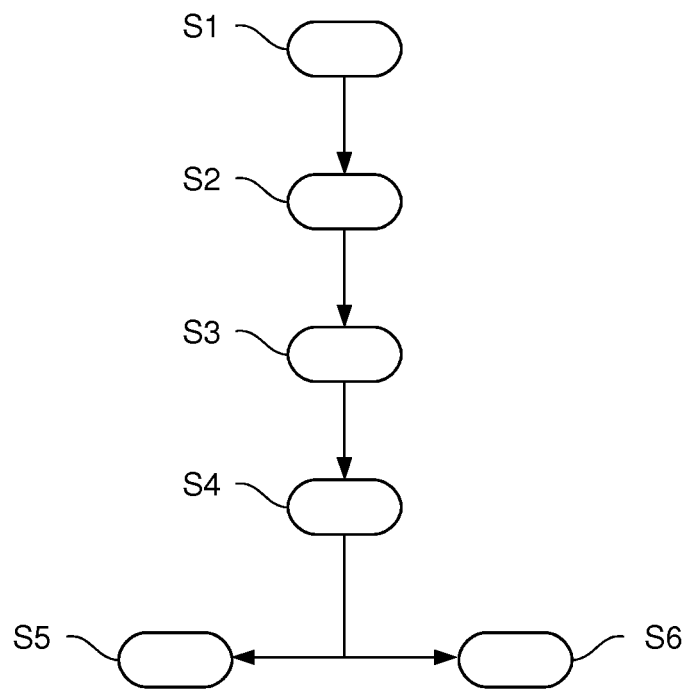
FIG. 2 is a flowchart for an embodiment of a method for controlling an execution of a software application on an execution platform in a first local network of the local networks shown in FIG. 1.

In order to control the execution of the software application 1 on the execution platform 2 in the first local network 6, a first environment fingerprint including a first network fingerprint of the first local network 6 is determined using predetermined rules (step S1 in FIG. 2). This first network fingerprint is characteristic for the first local network 6 and can be used for distinguish the first local network 6 from the other local networks 14-17. One example of the predetermined rules can be to generate a list of network printers present in the local network. Therefore, the first network fingerprint can be, for example, a list of the network printers 10, 11 which are present in the first local network 6.

This step S1 of determining the first environment fingerprint is preferably carried out when the software application 1 is to be executed for the first time on the execution platform 2.

Thereafter, a license including the first environment fingerprint is generated (step S2). The generation of the license can be carried out, for example, by sending the first environment fingerprint to the software vendor (for example via the internet 12). The software vendor signs and/or encrypts the first environment fingerprint (preferably in an automatic process) and sends it back to the software application or to any point within the first local network 6 known to the software application 1. Further, the license can include the allowed terms of use of the software application 1. The terms of use, which are preferably also signed and/or encrypted, together with the signed and/or encrypted fingerprint, form the license for the software application 1.

For controlling the execution of the software application 1, a second environment fingerprint including a second network fingerprint of the local network in which the execution platform 2 for the software application is included is determined by using the same predetermined rules (step S3).

Thus, in this case a list of network printers is generated as the second network fingerprint. As a next step a comparison of the two environment fingerprints is carried out (step S4). In this case, the software application 1 is to be executed on the execution platform 2 within the first local network 6 so that the second network fingerprint includes as the list of network printers the two network printers 10, 11. The comparison of the second environment fingerprint with the first environment fingerprint of the license leads therefore to the result that the second environment fingerprint is the same as the first environment fingerprint. In this case the execution of the software application is allowed (step S5).

If, for example, the software application 1 is to be executed in the further local network 14, the second network fingerprint would be different from the first network fingerprint. Therefore, the comparison of the two environment fingerprints would lead to the result that they are different and therefore the execution of the software application would be prevented (step S6).

The steps S1-S6 can be carried out by a control module included in the software application.

According to the described method the software application 1 can only be executed when being present in the first local network 6. Therefore, even if the software application 1 is to be executed in a virtual machine 23 running on the execution platform 2 of the first local network 6 an effective control of execution and therefore an effective license control can be ensured.

The first environment fingerprint can include a first execution platform fingerprint which is characteristic for the execution platform in the first network 6. If, for example, the software application 1 is to be executed in the virtual machine 23, the first execution platform fingerprint can comprise a feature unique and characteristic for the virtual machine 23. For example, a 35 vMAC address (virtual media access control address) can be used as unique identifier for the virtual machine 23. Of course, any other unique identifier for the execution platform 2, 23 can be used for the first execution platform fingerprint.

If the first environment fingerprint includes the first network fingerprint and the first execution platform fingerprint, a second execution platform fingerprint is determined in step S3 in the same way as in step S1. Then, when comparing the two environment fingerprints, a comparison of the two execution platform fingerprints can also be carried out. That avoids the problem that the second environment fingerprint is duplicated for all execution platforms within the first local network 6, and thus it would be possible for multiple instances of the software application 1 to be executed on different platforms 2, 7, 8 within the first local network 6 using a single license.

The execution platform fingerprint can include or can comprise any unique identifier for a specific execution platform 2, 7, 8 within the local network 6.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The invention is therefore not limited by the above described embodiments, methods, and examples, but extends to all embodiments and methods within the scope and spirit of the disclosure.

For example, the first local network 6 can also be a local network including an execution platform 2 embodied as a conventional personal computer and a television connected to the personal computer via cable or Wi-Fi. Further, any other or additional network compatible device can be part of the first local network 6. The MAC (media access control) address or any other unique identifier of at least one of the network compatible devices can be used for generating the first environment fingerprint and in particular the first network fingerprint.

Accordingly, reference should be made to the appended claims, rather than to the foregoing specification, as indicating the scope of the invention.

The invention claimed is:

1. Method for controlling an execution of a software application on an execution platform in a first local network, comprising:
   a) determining a first environment fingerprint including a first network fingerprint of the first local network by using at least two devices relating to the first local network and predetermined rules, the first network fingerprint including a domain name relating to the first network or unique information stored in a directory relating to the first network, wherein said first network fingerprint is characteristic for the first local network and is operative to distinguish the first local network from other local networks,
   b) generating a license including said first environment fingerprint, wherein said license defines terms of allowed execution of the software application on an execution platform in the first local network, the license being locked to the first local network; and
   c) whenever the execution of the software application is attempted, controlling the execution by:
      determining a second environment fingerprint including a second network fingerprint of a candidate local network by using said predetermined rules,
      comparing the second environment fingerprint with the first environment fingerprint of the license,
      allowing the execution of the software application according to the terms of the license where the second environment fingerprint complies with the first environment fingerprint, and
      preventing the execution of the software application where the second environment fingerprint does not comply with the first environment fingerprint;
   wherein in step c) the compliance of the two environment fingerprints is considered as being present if a predetermined partial compliance of the two environment fingerprints is present.

2. Method according to claim 1, wherein the first environment fingerprint includes a unique feature relating to a virtual machine.

3. Method according to claim 1, wherein the first network fingerprint includes at least one feature of the first local network which is already present and which is not generated by the method for controlling.

4. Method according to claim 1, further comprising amending the first local network in order to create a unique feature of the first local network before carrying out step a), and wherein the network fingerprint includes information characteristic for said unique feature.

5. Method according to claim 1, wherein the first network fingerprint includes at least two different features and wherein in step c) the compliance of the two environment fingerprints is considered as being present if at least one of the two features is the same in both network fingerprints.

6. Method according to claim 1, wherein the license includes a predetermined compliance algorithm which carries out the step of comparing the two environment fingerprints in step c).

7. Method according to claim 1, wherein the first network fingerprint includes at least two features and the method includes:
   checking whether all features of the first network fingerprint are present; and
   where not all but only some features of the first network fingerprint are present, replacing at least one of the not present features by another feature of the first local network.

8. Method according to claim 1, wherein the first network fingerprint is amended such that an additional feature characterizing the first local network is added to the first network fingerprint.

9. Method according to claim 1, wherein the first environment fingerprint includes a first execution platform fingerprint which is characteristic for said execution platform in said first local network and which is determined in step a), wherein the second environment fingerprint includes a second execution platform fingerprint which is determined in step c), and wherein in step c) the two execution platform fingerprints are compared.

10. Method according to claim 1, wherein allowing the execution of the software application according to the step c) comprises allowing the execution of the software application within a Virtual Machine.

11. Non-transitory computer readable storage medium, which comprises software code executable on a computer to cause the computer to carry out a method for controlling an execution of a software application on an execution platform in a first local network, comprising:
   a) determining a first environment fingerprint including a first network fingerprint of the first local network by using at least two devices relating to the first local network and predetermined rules, the first network fingerprint including a domain name relating to the first network or unique information stored in a directory or relating to the first network, wherein said first network fingerprint is characteristic for the first local network and is operative to distinguish the first local network from other local networks,
   b) generating a license including said first environment fingerprint, wherein said license defines terms of allowed execution of the software application on an execution platform in the first local network, the license being locked to the first local network;
   c) whenever the execution of the software application is attempted, controlling the execution by
      determining a second environment fingerprint including a second network fingerprint of a candidate local network by using said predetermined rules,
      comparing the second environment fingerprint with the first environment fingerprint of the license,
      allowing the execution of the software application according to the terms of the license where the second environment fingerprint complies with the first environment fingerprint, and
      preventing the execution of the software application where the second environment fingerprint does not comply with the first environment fingerprint;
   wherein in step c) the compliance of the two environment fingerprints is considered as being present if a predetermined partial compliance of the two environment fingerprints is present.

12. Control system for controlling an execution of a software application on an execution platform in a first local network, comprising a computer hardware control module comprising logic operative to:
  a) determine a first environment fingerprint including a first network fingerprint of the first local network by using at least two devices relating to the first local network and predetermined rules, the first network fingerprint including a domain name relating to the first network or user credentials or unique information stored in a directory relating to the first network, said first network fingerprint being characteristic for the first local network and being usable to distinguish the first local network from other local networks,
  b) generate a license including said first environment fingerprint, said license defining terms of allowed execution of the software application on an execution platform in the first local network, the license being locked to the first local network: and
  c) whenever the execution of the software application is attempted, control the execution by:
  determining a second environment fingerprint including a second network fingerprint of the local network by using said predetermined rules,
  comparing the second environment fingerprint with the first environment fingerprint of the license, and
  allowing the execution of the software application according to the terms of the license in case of the second environment fingerprint complies with the first environment fingerprint, and preventing the execution of the software application in case of the second environment fingerprint does not comply with the first environment fingerprint;
  wherein in step c) the compliance of the two environment fingerprints is considered as being present if a predetermined partial compliance of the two environment fingerprints is present.

* * * * *